United States Patent Office 2,703,026
Patented Mar. 1, 1955

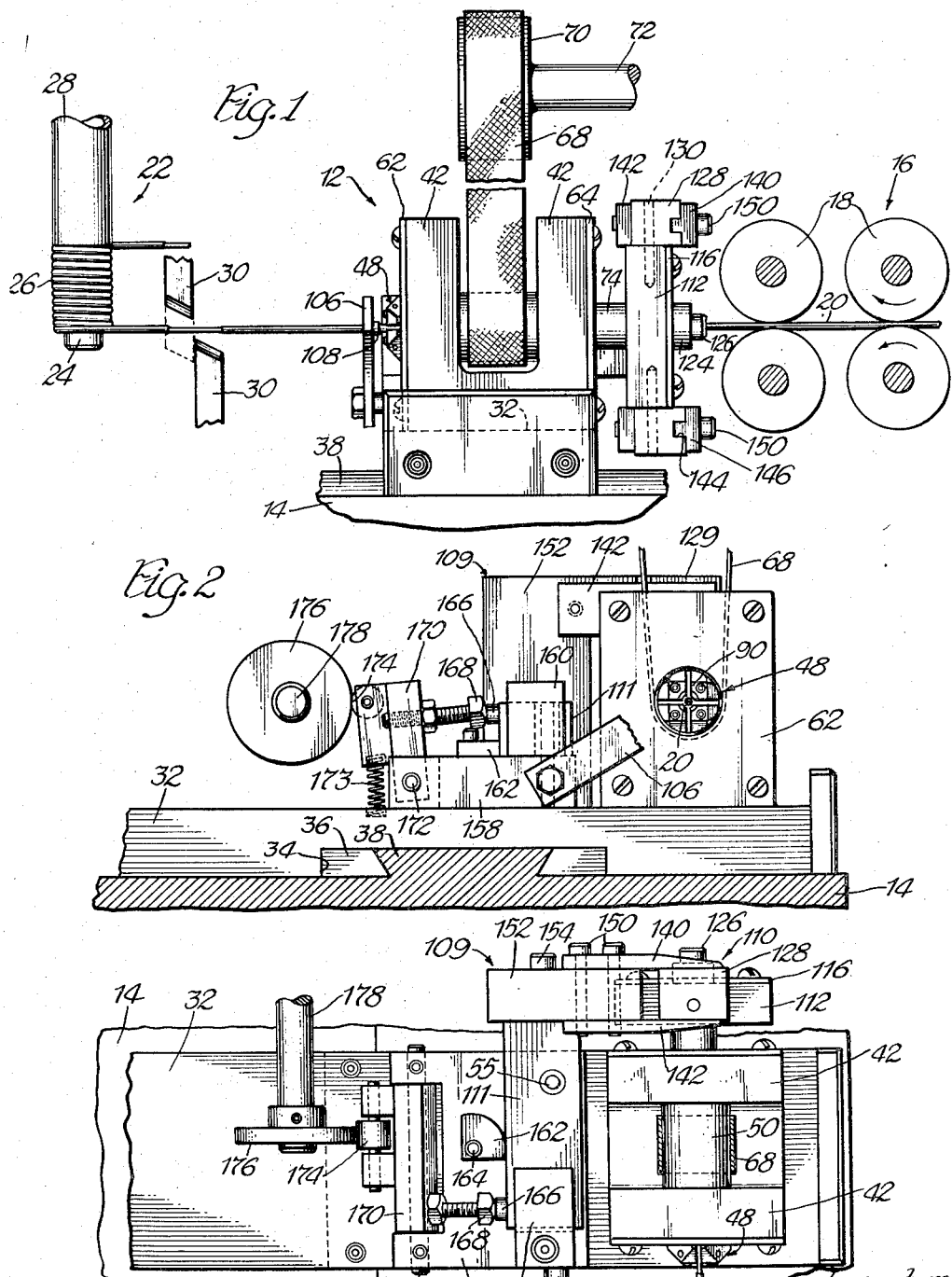

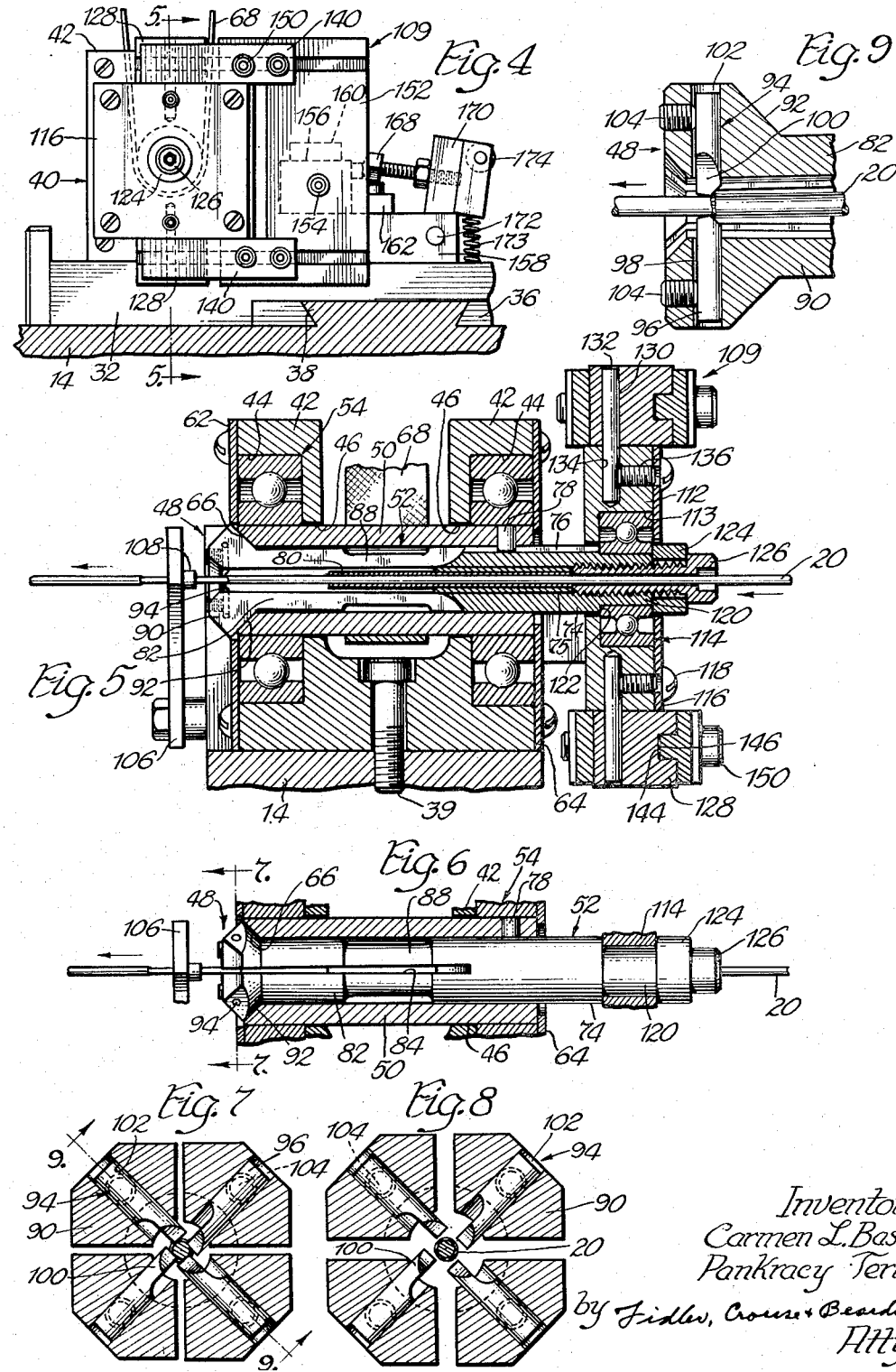

2,703,026

APPARATUS FOR STRIPPING INSULATION FROM WIRE

Carmen L. Basile and Pankracy Terry, Chicago, Ill., assignors, by direct and mesne assignments, to Taylor Spring and Manufacturing Company, Chicago, Ill., a corporation of Illinois Application May 17, 1951, Serial No. 226,846

6 Claims. (Cl. 81—9.51)

This invention relates to a method of stripping insulation from wire and apparatus for carrying the method into effect.

The invention is particularly adapted for removing insulation of the enamel type that is firmly bonded to the wire and which, from the standpoint of removing it from the wire, is for all practical purposes integral with the wire. One type of such insulation is composed of nylon in the form of enamel. The invention however is not limited to use in connection with such kind of insulation.

The invention is also particularly adapted for use in connection with small gauge wire but is not limited to any particular sized wire. The invention involves cutting or stripping elements that rotate circumferentially of the wire at high speed and are movable into cutting engagement with the wire to the extent necessary according to the gauge of wire being stripped.

An object of the invention, therefore, is the provision of an apparatus of the character referred to having cutting elements that need not be specially shaped or dimensioned as to the particular size or kind of wire being stripped but can be utilized for stripping insulation from wire of any size within a wide range of sizes.

Another object of the invention is the provision of insulation stripping means and a method of stripping insulation that can be utilized in conjunction with a machine for shaping wire and thereby eliminates the necessity of an operation separate from the shaping operation. So far as the present inventors are aware there has never been heretofore a method or apparatus for stripping wire in an operation that is for all practical purposes a continuous operation with respect to the feeding of wire through a shaping machine for shaping the wire.

An object of the invention is the provision of a method of stripping insulation from wire which includes moving the wire in one direction and simultaneously therewith engaging the wire by cutting elements moving at a high rate of speed.

Another object is the provision of a method of stripping insulation from wire especially suitable for utilization with a machine for shaping the wire, by means of which the insulation is stripped from the wire while the wire is in motion in being fed through the machine in the shaping operation and without in any way interfering with or modifying the shaping operation.

Another object of the invention is the provision of a method of stripping insulation from wire which includes moving the wire longitudinally and engaging the wire with cutting elements moving in directions transverse to the movement of the wire.

Still another object is the provision of apparatus for stripping insulation from wire, having such novel construction as to enable it to be effective during movement of the wire.

A further object is the provision of apparatus for stripping insulation from wire, having such construction and arrangement of elements for accommodating movement of the wire therethrough and having cutting elements operative for movement into and out of engagement with the wire.

A still further object is the provision of apparatus for stripping insulation from wire including a rotatable device having a central passage for the movement of wire therethrough and cutting elements movable radially into and out of engagement with the wire.

Still another object is the provision of an apparatus for stripping insulation from wire including a device mounted for rotation and for limited axial movement, having an axial opening for the movement of wire therethrough, and having circumferentially spaced cutting elements mounted for movement into and out of engagement with the wire, and arranged for cooperation with wedging means whereby upon axial movement of the device the stripping elements are wedged radially inwardly into engagement with the wire.

Other objects of the invention will be apparent upon reference to the following description taken in conjunction with the accompanying drawings in which:

Figure 1 is an end view of the apparatus of our invention with certain other elements, illustrated semidiagrammatically, of a shaping machine;

Fig. 2 is a view from the left of Fig. 1;

Fig. 3 is a plan view of the apparatus;

Fig. 4 is a view from the right of Fig. 1;

Fig. 5 is an enlarged sectional view taken on line 5—5 of Fig. 4;

Fig. 6 is a view of the central portion of Fig. 5 but with the central cutting tool shown in elevation;

Fig. 7 is an enlarged sectional view taken on line 7—7 of Fig. 6, with the cutting tool elements in contracted position;

Fig. 8 is a view similar to Fig. 7 but with the cutting tool elements in expanded position; and Fig. 9 is a view taken on line 9—9 of Fig. 7.

Referring in detail to the drawings, the stripping apparatus of our invention is shown as a whole at 12 and is to be mounted on or in connection with a machine for shaping wire. Such a machine may be any of a variety of machines but for purposes of convenience reference is made to one type of wire shaping machine identified as Torsion Spring Machine, Series 614, put out by Sleeper & Hartley, Inc., Worcester, Massachusetts. Such a machine is provided with a convenient form of stand or base having an upper deck element 14 on which the wire stripping apparatus 12 is mounted. The machine includes a wire feeding mechanism 16, which is here illustrated semidiagrammatically, including a plurality of wheels or rollers 18 gripping the wire on opposite sides and rotating in the direction indicated for feeding the wire 20 (to the left as viewed in Fig. 1) through the stripping apparatus 12 and to a shaping station 22 at which location is provided a spindle 24 about which the wire 20 is coiled or shaped, and a sleeve 28 cooperating with the spindle for forming the coil 26 and adapted to be depressed for ejecting the coil off of the spindle 24 at the appropriate time. Shearing elements 30 are also provided on the spring machine for cutting the wire 20 during or slightly before the time the coil 26 is ejected from the spindle. It is believed unnecessary to elaborate upon the details of construction of the portions of the spring machine just described, namely, the feed mechanism 16 and the elements at the shaping station 22 since they are standard mechanisms insofar as the present invention is concerned. Suffice it to say that the feeding mechanism 16 is actuated at appropriate times for feeding the wire 20 to the shaping station 22 in accordance with the timing and the operations involved in the shaping operation. The feeding mechanism 16 is operated intermittently, that is, it runs continuously during that interval of time for feeding wire to form a coil 26, and after that has been accomplished and during the time that the coil 26 is being ejected from the spindle, the feeding mechanism ceases operation. The spring machine is provided with means forming standard equipment for accomplishing the purpose just mentioned and reference can be made to that machine for any further details that may be desired.

One of the purposes of the spring machine referred to is to form springs as well as other shapes and although such may be one of its primary purposes, it may also be used for forming electrically conductive coils. For example, coils such as shown at 26 may be utilized as tuning coils for radio and television apparatus and for that purpose the wire 20 is made up of electrically conductive material, for example, copper. The copper wire is coated with an insulation which, in the present instance, may be composed of nylon in the form of enamel and when deposited on the wire becomes for practical purposes, from the standpoint of stripping the insulation from the wire, integral with the wire.

The insulation stripping apparatus 12 is positioned on the spring machine 14 in such a position that the wire 20 in its normal progress to the shaping station 22 passes through the stripping apparatus and, as will be brought out in detail later, operates in such a way as not to interfere with the operation of the spring machine in the shaping operations of the latter. It is believed to be entirely new to remove insulation from wire as it is being shaped or otherwise worked upon without in any way interfering with the shaping operation or other similar operations.

The insulation stripping apparatus 12 includes a base 32 which may be in the form of a steel plate having a recess 34 on its under surface for receiving elements 36 securely held therein and having inclined surfaces forming a groove for cooperation with a tongue element 38 formed on the machine element 14. If desired, other suitable means may be utilized for mounting or anchoring the base plate 32 on the machine 14.

Mounted on the base plate 32 by means of a screw 39 is a block 40 which is preferably also of steel as are all of the other elements of the apparatus in keeping with the requirement for strength in the apparatus. The block 40 is provided with two upstanding portions 42 having bearing sockets 44 and aligned openings or apertures 46. Mounted in the aligned openings 46 is a cutting tool indicated as a whole at 48 which includes an outer sleeve 50 and an inner tubular element or cutting tool proper 52. The outer sleeve 50 is mounted in bearings 54 in the sockets 44, the bearings preferably being standard ball bearings, as illustrated. The inner races of the bearings are fitted on the sleeve 50 and the bearings are retained in their respective sockets by end plates 62 and 64, both plates having central apertures for receiving elements of the cutting tool, the plate 64 having an inner portion engageable with one end of the sleeve 50 for retaining the sleeve in position against axial displacement in that direction. One end of the sleeve 50 which will be referred to, for convenience, as the outer end (left end as viewed in Figs. 1 and 5) is provided with an inner tapered or truncated cone surface 66 for coacting with similar surfaces on the cutting tool 52 for moving the cutting tool into position for stripping insulation from the wire, as will be explained in detail later.

The sleeve 50 is mounted for rotation in the block 40 being so mounted by means of the bearings 54. For purposes of rotating the sleeve a belt 68 is trained thereover and over a pulley 70 mounted on a shaft 72 which may be driven by any convenient source of power such as an electric motor or other power means. The sleeve 50 and the cutting tool, as will be explained later, is rotated constantly and therefore it will be found convenient to drive the belt from a source other than the motive power for the spring machine 14. The constantly rotating cutting tool is alternately brought into and out of cutting engagement with the wire moving therethrough in timed relationship with the feed of the wire 20 through the device. The cutting tool 52 is mounted for rotation with the sleeve 50 and for limited axial sliding movement with respect to the sleeve. The cutting tool includes a core portion 74 which is in the form of a tubular element continuous or solid in a circumferential direction, with a longitudinal axial bore 75 for receiving the wire 20. The core portion 74 is of such outer diameter as to have a sliding fit with the inner surface of the sleeve so as to enable the cutting tool to readily move axially relatively to the sleeve. The core portion includes an axially extending keyway 76 into which projects a key 78 which may be in the form of a pin press-fitted in an aperture in the sleeve 50. A sleeve 80 is fitted in the bore 75 to act as a guide for the wire.

Extending forwardly from the core portion 74 and integral therewith are a plurality of fingers or elements 82 together forming a chuck-like member, which are preferably formed by means of slotting the cutting tool longitudinally as indicated at 84, the fingers thereby being spaced circumferentially of the cutting tool and extending axially thereof. The fingers 82 are preferably of reduced radial dimension, so formed by a central bore 86 of greater diameter than that of the bore 75. A peripheral cutout portion 88 is also provided on the outer surface of the fingers to render the latter more flexible for enabling radial movement of the extended ends thereof. The cutting tool 52 is made of spring steel and is of such character that the fingers 82 are normally self-biased radially outwardly, and can be flexed radially inwardly upon application of pressure for that purpose.

The outer ends of the fingers 82 are provided with enlarged portions 90 which together form a tool head having an inner inclined surface 92 in the shape of a truncated cone for engagement with the similarly shaped truncated cone surface 62 on the sleeve 50. Upon axial movement of the cutting tool 52 inwardly (to the right, Fig. 5) the surfaces 92 and 66 interengage, producing a radial inward movement of the outer ends of the fingers 82 for moving the cutting elements into cutting engagement with the wire, and upon release of the forces so moving the cutting tool, the normal outward bias of the fingers, acting through the wedging or camming surfaces 92 and 66, moves the cutting tool to the left and the outer ends of the fingers spread or move radially outwardly, thereby moving the cutting elements out of engagement with the wire.

The cutting elements referred to and indicated at 94 are best shown in Figs. 7, 8 and 9 and each includes a shank portion 96 having a flat face 98 and a bit portion 100. The cutting elements are inserted in bores 102 extending radially of the fingers, being secured therein by any convenient means such as set screws 104 threaded in tapped apertures in the outer end of the fingers and engaging the flat faces of the cutting elements. The cutting elements at their inner ends extend inwardly of the fingers for engagement with the wire upon contraction of the fingers as illustrated best in Figs. 7, 8 and 9. The cutting elements 94 are of the desired hard material as to withstand wear and are provided with appropriate shapes at their inner ends for stripping the insulation from the wire.

A wire guide 106 is preferably mounted at any convenient location on the apparatus for extension to the path of the wire 20 where it is provided with an aperture and guide element 108 through which the wire 20 passes. The guide thus retains the wire in properly aligned position against the action of the cutting tool and in position for proper feeding to the shaping station 22.

As mentioned above, the cutting tool is rendered effective for stripping insulation upon its being moved axially rearwardly (to the right, Fig. 5) and rendered ineffective upon reverse movement. The particular means for so moving the cutting tool 52 in an axial direction may assume any of a number of different forms but we have shown herein one such means adapted for use with the torsion spring machine referred to above and having special features of construction for assuring accurate sliding movement of the cutting tool so as to eliminate all binding and other objectionable forces. Such an actuating mechanism, as best shown as a whole in Fig. 3, includes a pivoted L shape arm or bell crank 109 having an arm 110 extending transversely of the axis of the cutting tool 52 and an arm 111 extending longitudinally thereof, mounted and operating in a manner to be later described. Supported by the arm 110 is a block 112 having a central opening and fitted over the inner end of the cutting tool 52 which extends from the adjacent end of the block 40. The block 112 includes a bearing socket 113 having a thrust ball bearing 114 fitted therein, such bearing being adapted to withstand axial thrust in connection with the axial movement of the cutting tool 52; any desired form of bearing may be utilized for the purpose. The bearing 114 may be retained in the socket by any convenient means, such as a plate 116 secured to the block by such means as screws 118. The inner race of the bearing 114 is fitted on a reduced diameter portion 120 of the core portion 74 and confined between a shoulder 122 and a collar 124, the latter being held in place by a tubular set screw 126 threaded into a tapped bore in the core portion 74. The set screw 126 has an axial bore for accommodating the wire 20. The tool 52 is permitted free rotation in the block 112 by virtue of the bearing 114, the collar 124 and set screw 126 rotating with the tool.

The block 112 is mounted for both pivotal and sliding movement for compensating for different directions of movement of the cutting tool and arm 110. The arm 110 is of bifurcated formation, with upper and lower portions, including blocks 128 provided with vertically extending pins 130 freely rotatable in bores 132 therein. The pins 130 extend in respective bores 134 in the block 110 where securing means such as set screws 136 are threaded in tapped openings in the block and engage flattened surfaces of the pins. The block 110 is accordingly enabled to pivot about the axis of the pins 130 relative to the arm 110.

The blocks 128 are supported in the bifurcated arm 110 by means of clamping elements 140 and 142 on opposite sides thereof. The blocks 128 are provided with horizontal grooves 144 for receiving tongues 146 on clamping elements 140. The blocks 128 are thus supported for sliding movement along the clamping elements and therefore longitudinally of the arm 110. This sliding movement and consequent sliding movement of the block 112 compensate for the arcuate movement of the arm 110 and axial movement of the cutting tool 52, and enable the block 110 to move the cutting tool 52 axially without binding. The clamping elements 140 and 142 are secured by convenient means, such as screws 150, to an element 152 which in turn is secured as by means of a screw 154 to the arm 111. The arm 111 receives a mounting screw 155 which extends into a support 158 mounted on the base 32. The forward end of the arm 111 is preferably confined under a guide 160 mounted on the support 158. A quadrant-shaped stop 162 is arranged for engagement by the arm 111 for limiting movement of the arm in a clockwise direction (Fig. 3). The stop 162 is mounted on the support 158 as by means of a set screw 164 enabling adjustment of the stop 162 about the screw as an axis. The arcuate portion of the stop 162 is eccentric to the screw whereby, upon appropriate adjustment of the stop, the movement of the arm 111 is limited to respective extents according to the sizes of wire being stripped and the desired movement of the cutting tool 52. A pin such as 166 may be mounted in the arm 111 for engagement by a screw 168 or other form of device for moving or actuating the bell crank 109. In the present instance the actuating mechanism for the purpose stated includes a swinging element 170 in the form of a lever carrying the screw 168 and pivoted on a pin 172 in the support 158 for swinging about a horizontal axis. A compression spring 173 is confined between the lever 172 and base 32 for yieldingly maintaining the lever 170 in engagement with the pin 166. The lever 170 is preferably provided with a roller 174 for antifriction engagement with a cam 176 mounted on a shaft 178 which is driven by a source of power provided on the machine 14 on which the insulation stripping apparatus is mounted for synchronized operation of the apparatus with the operation of the wire feeding mechanism 16.

The cam or eccentric 176 need have only a slight throw for effecting the desired movement of the cutting tool 52. Upon the cam 176 reaching the desired position, that is, when the lobe thereof engages the roller 174, the lever 170 is swung clockwise (Fig. 2) whereupon the bell crank 109 is swung counterclockwise (Fig. 3) and the block 112 is drawn inwardly (to the right, Fig. 5) resulting in the cutting tool 52 being drawn inwardly and causing the cutting elements 94 to be moved radially inwardly into cutting engagement with the wire as above described in connection with the action of the wedging or camming surfaces 92 and 66.

In the operation of the machine 14 and not considering for the moment the insulation stripping apparatus, the wire feeding mechanism 16 is operated intermittently. For example, the feeding mechanism feeds the wire to the shaping station 22 during a timed interval sufficient for advancing the proper amount of wire to form the coil 26. When that step has been accomplished the feeding mechanism 16 is stopped, the shearing elements 30 are actuated and the coil 26 is ejected from the spindle 24. Thereafter the feeding mechanism again is actuated for feeding wire to the shaping station for forming another coil.

The operation of the feeding mechanism 16 and the shaping operation are not affected by the insulation stripping operation. The operation of the cam 176 is synchronized with the feeding mechanism 16 so that the cutting elements 94 are brought into engagement with the wire while the wire is in motion; the cutting elements are brought out of engagement with the wire while the wire is still in motion, and when the wire is stationary, the cutting elements remain out of engagement with the wire. Moreover, the operation of the cutting tool is so timed relative to the feeding and shaping operation of the wire that the insulation is stripped from the wire only at certain timed intervals, whereby, in one example and as here illustrated, insulation is stripped from the ends of the coil 26. In order to accomplish the effect just mentioned the insulation is stripped from the wire in such lengths and at such spacing that the shearing elements 30 cut the wire midway of a stripped portion of the wire. The coil 26 therefore has both ends stripped of insulation for conductive securement thereto of electrical leads.

It will be seen that the insulation stripping operation is performed by cutting elements engaging the wire and rotating circumferentially around the wire while the wire is in motion longitudinally—a method believed heretofore unknown.

During any interval of operation of the insulation stripping apparatus, the wire 20 continues to move therethrough and from the standpoint of stripping insulation, the wire may be considered as constantly moving. The intermittent movement of the wire is for purposes of carrying out the shaping operation and not for the purpose of accommodating the stripping operation.

We have found that high speed rotation of the stripping apparatus is most effective, preferably at a rate of approximately 10,000 R. P. M. However, a wide latitude is permitted in the rate of rotation. We have found that satisfactory results can be obtained if the cutting tool is rotated at any rate between approximately 5,000 R. P. M. and 15,000 R. P. M.

It will be appreciated that the insulation on the wire 20 is not of great depth and the cutting elements 94 need be moved radially inwardly only a slight amount in order to entirely remove the insulation. The thickness of the insulation is exaggerated (Figs. 7 and 8) for convenience in illustration.

As mentioned above, one of the objects of the invention is the provision of an insulation stripping apparatus that can be used for all sizes of wires within a wide range. The cutting tool is set to the desired original position and moved the proper axial extent to accommodate the size of wire being stripped. For example, we have utilized the same apparatus for stripping insulation from wires of from .020" to .062" in diameter. Obviously larger sizes of wire can readily be stripped by the apparatus. These specific examples are not intended to be limiting but merely illustrative. The cutting elements or any other portion of the stripping apparatus need not be specially shaped for operation on wire of any particular size. Other insulation stripping machines have been designed but they have not proved as effective as the present apparatus; such prior machines included for example specially shaped cutting elements for accommodating certain sized wire; others were arranged for relative longitudinal movement between the stripping device and the wire; and others took various other forms. However, it is believed that there has been no previous machine or apparatus effective for removing insulation from wire in conjunction with other operations on the wire, without in any way interfering with or modifying such other operations.

We claim:

1. In a device of the character disclosed, a tubular cutting tool for movement of wire therethrough, rotatable tubular mounting means surrounding and supporting said cutting tool, said cutting tool being mounted for rotation with said mounting means and for limited axial movement relative thereto, a plurality of radially inwardly extending cutting elements mounted in said cutting tool, and circular wedge means on said mounting means and said cutting tool operative in response to axial movement of said cutting tool for moving said cutting elements radially inwardly into cutting engagement with a wire in the cutting tool.

2. In a device of the character disclosed, a tubular cutting tool, rotatable tubular mounting means surrounding and supporting the cutting tool, said cutting tool being mounted for rotation with said mounting means and for limited axial movement relative thereto, said cutting tool also having an axial bore for movement of wire therethrough and including a circumferentially solid portion and a plurality of circumferentially spaced axially extending fingers, cutting elements mounted in the extended ends of said fingers for engagement with a wire in said bore, and circular wedge means on said mounting means and cutting tool for moving the extended ends of said fingers radially inwardly for moving said cutting elements into cutting engagement with the wire.

3. In a device of the character disclosed, a cylindrical cutting tool, means mounting the cutting tool for rotation about its longitudinal axis and for limited movement along its axis, said cutting tool having an axial bore for movement of wire therethrough and including a circumferentially solid portion and a plurality of circumferentially spaced axially extending integral fingers, said fingers being normally self-biased radially outwardly and being capable of radial inward flexing, cutting elements mounted in the extended ends of said fingers for engagement with a wire in said bore, and wedge means on said mounting means and said fingers operative in response to axial movement of said cutting tool in one direction for moving the extended ends of said fingers radially inwardly and moving said cutting elements into engagement with said wire, said fingers having sufficient radial outward bias for moving said tool in the opposite axial direction upon release of the original moving force and enabling the ends of the fingers to move radially outwardly and move said cutting elements out of engagement with the wire.

4. In a wire insulation stripping device, a cutting tool including an outer sleeve and an inner tubular element, means for mounting said sleeve for rotation about its longitudinal axis and against axial displacement, said tubular element being mounted for rotation with said sleeve and for limited axial sliding movement relative thereto and including a circumferentially solid portion and a plurality of integral, circumferentially spaced fingers extending axially therefrom, radially extending cutting elements mounted in the extended ends of said fingers adapted to engage a wire in said tubular element, said sleeve and fingers having interengaging camming surfaces operative in response to axial movement of said tubular element for moving the extended ends of said fingers radially inwardly and thereby moving said cutting elements into cutting engagement with the wire, and actuating means for moving said tubular element axially including a lever mounted for movement about a pivotal axis transverse to the axis of said cutting tool and having a member connected to said tubular element mounted for pivotal movement about an axis parallel with the pivotal axis of said lever and sliding movement in directions longitudinally of said lever, said fingers being normally self-biased radially outwardly and having sufficient resilience to move said tubular element axially in the opposite direction upon release of the original moving force.

5. In a wire insulation stripping device, a cutting tool including an outer sleeve and an inner tubular element, means for mounting said sleeve for rotation about its longitudinal axis and against axial displacement, said tubular element being mounted for rotation with said sleeve and for limited axial sliding movement relative thereto and including a circumferentially solid portion and a plurality of integral, circumferentially spaced fingers extending axially therefrom, radially extending cutting elements mounted in the extended ends of said fingers adapted to engage a wire in said tubular element, said sleeve and fingers having interengaging camming surfaces operative in response to axial movement of said tubular element for moving the extended ends of said fingers radially inwardly and thereby moving said cutting elements into cutting engagement with the wire, and actuating means for moving said tubular element axially including a lever mounted for movement about a pivotal axis transverse to the axis of said cutting tool and having a member connected to said tubular element mounted for pivotal movement about an axis parallel with the pivotal axis of said lever and sliding movement in directions transversely of said tubular member, said fingers being normally self-biased radially outwardly and having sufficient resilience to move said tubular element axially in the opposite direction upon release of the original moving force, said lever having portions disposed at right angles to each other, and cam-operated means engageable with said lever for swinging the lever about its pivotal axis.

6. In a wire insulation stripping device, a base having bearing sockets with aligned openings therein, a cutting tool mounted in said openings and including an outer sleeve and an inner tubular member, bearings in said sockets for mounting said sleeve for rotation and against axial movement, said tubular member being mounted for rotation with said sleeve and for limited axial movement relative thereto and including a circumferentially solid portion and a plurality of circumferentially spaced axially extending fingers, cutting elements extending radially inwardly from the extended ends of said fingers for engagement with a wire moving through said tubular member, said sleeve and fingers having interacting camming surfaces operative in response to axial movement of said tubular member for moving the extended ends of said fingers radially inwardly and thereby moving said cutting elements into cutting engagement with the wire, and means for moving said tubular element axially during rotation of the cutting tool including a non-rotatable block in engagement with said tubular element and having bearings therebetween and a lever mounting said block and mounted for pivotal movement about an axis transverse to the axis of said cutting tool, said lever having bifurcated elements pivotally mounting said block about an axis parallel with the pivotal axis of the lever and enabling sliding movement of the block in directions longitudinally of the lever.

References Cited in the file of this patent

UNITED STATES PATENTS

| | | |
|---|---|---|
| 967,998 | Swan | Aug. 23, 1910 |
| 988,616 | Anderson | Apr. 4, 1911 |
| 1,273,417 | Smith | July 23, 1918 |
| 1,433,320 | Wersel | Oct. 24, 1922 |
| 1,597,460 | Nelson | Aug. 24, 1926 |
| 1,676,738 | Lotterman | July 10, 1928 |
| 1,802,453 | Wright | Apr. 28, 1931 |
| 1,831,115 | Holmes | Nov. 10, 1931 |
| 1,921,384 | Crowell | Aug. 8, 1933 |
| 2,438,797 | Bagge | Mar. 30, 1948 |